April 23, 1957 W. C. TINUS 2,790,170
INDICATING SYSTEM
Filed June 8, 1940 5 Sheets-Sheet 1

INVENTOR
W. C. TINUS
BY
H. O. Wright
ATTORNEY

April 23, 1957  W. C. TINUS  2,790,170
INDICATING SYSTEM

Filed June 8, 1940  5 Sheets-Sheet 4

INVENTOR
W. C. TINUS
BY
H. O. Wright
ATTORNEY

April 23, 1957 W. C. TINUS 2,790,170
INDICATING SYSTEM
Filed June 8, 1940 5 Sheets-Sheet 5
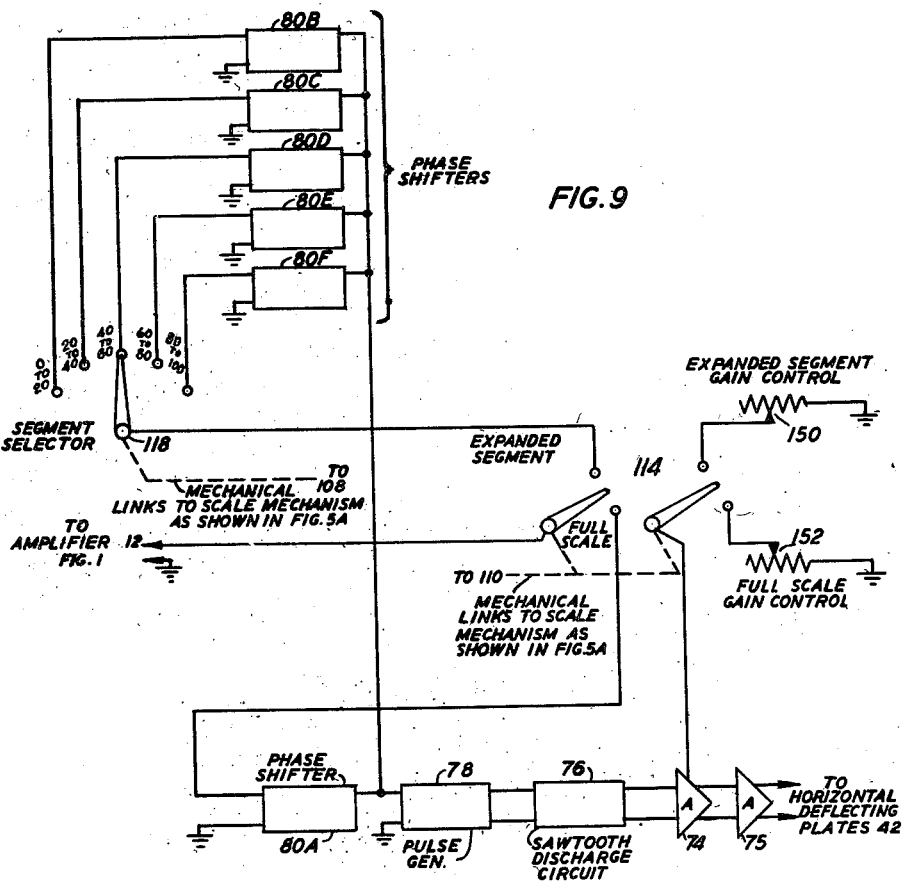
INVENTOR
W.C. TINUS
BY
H. O. Wright
ATTORNEY

United States Patent Office 2,790,170
Patented Apr. 23, 1957

2,790,170

INDICATING SYSTEM

William C. Tinus, Maplewood, N. J., assignor to Bell Telephone Laboratories, Incorporated, New York, N. Y., a corporation of New York Application June 8, 1940, Serial No. 339,585

3 Claims. (Cl. 343—13)

This invention relates to improved indicating systems of the type which employ cathode ray indicators. More particularly, it relates to a method and means for furnishing an accurate, continuous calibration for indicating systems using cathode ray indicators and to a method and means for rapidly and conveniently changing the effective scale of cathode ray indicators, as well as to improved means for determining signal pulse positions relative to the calibrations.

It is, of course, a well-known practice in the art to employ a cathode ray tube as a timing device to determine the time intervals between a particular sequence of signals. In such systems, the ray is deflected, by means of a varying voltage, at a known rate along a predetermined path and the signals are impressed upon deflecting plates in such manner as to cause transverse deflections of the ray from its normal path. The disposition of the deflections along the normal path of the ray on the target of the tube indicates the time intervals existing between the signals. A fixed scale is commonly associated with the target of the cathode ray tube and calibrated so that the time or corresponding space relation existing between the deflections caused by the signals may be read directly. The deflection of the ray along its normal path may take place at a linear rate if the whole range being scanned is of uniform importance or the deflection rate may vary in accordance with an exponential, or other law of variation, where more detailed information is desired as to the signal distribution within particular portions of the range.

It is, however, difficult to obtain a voltage for the purpose of deflecting the ray along its normal path which always follows precisely the law of variation desired. In fact, it is even difficult to obtain a voltage in which departures from the desired variation law are precisely constant. Also the mean position of the ray is subject to minor variations, such as those caused by fluctuations in the positioning bias voltages, and those caused by changes in the position of the indicator with respect to external magnetic fields, such as, for example, the earth's field.

It is, therefore, an object of this invention to provide a method and means for continuously and precisely calibrating the progress of the cathode ray along its normal path on the screen or target.

Another object is to provide a method and means for rapidly and conveniently changing the effective scale of cathode ray indicators.

An additional object is to increase the ease and accuracy with which readings may be taken on cathode ray indicators.

A further object is to provide a method and means for continuously checking the calibration of cathode ray and other "time-spacing" indicators.

Other objects will appear during the course of the following description and in the appended claims.

One feature of the method of the invention comprises imposing upon the deflecting plates, upon which the sequence of signals to be timed is also impressed, a second sequence of sharp impulses, hereinafter referred to as marking impulses, having known time intervals therebetween. The latter impulses are preferably of a convenient, uniform amplitude. The definitely timed sharp impulses, in effect, establish a scale on the trace of the ray across the target of the tube. The accuracy of this scale is not affected by the departure of the sweep circuit voltage from its normal mode of variation and any substantial variations of the sweep circuit from its normal mode of variation are at once made apparent by a change of spacing between the marking impulses. Approximate scales may, if desired, be permanently engraved upon the target of the tube in accordance with the practice heretofore followed and inaccuracies thereof will be made evident by comparison with the positions of the marking impulses upon the trace. The intervals between the sequence of signals to be timed may likewise be accurately determined by comparison of the positions of the deviations caused by them with the positions of the marking impulses.

Subdivisions of the intervals between one sequence of marking impulses may be marked by impressing one or several additional sequences of definitely timed impulses upon the transverse deflecting plates simultaneously. The several trains of marking impulses may be conveniently distinguished by making their respective amplitudes substantially different.

Evidently, also, two or more scales based upon different units may be provided concurrently, or in quick succession, so that the unknown intervals may be read in terms of several known units, as desired.

A further feature of the invention comprises means for selecting any one of a number of discrete portions of the total time interval elapsing during the sequence of signals to be timed, means for causing the ray to sweep across the entire trace once during each such discrete portion of the said total time interval and means for impressing a sequence of marking pulses on the transverse deflecting plates to provide an appropriate scale for the said discrete portion. This feature permits a more detailed scrutiny of the distribution of the signal impulses within each of said discrete portions of the total trace than would otherwise be possible. Mechanical means for placing an appropriate scale adjacent to the trace of the ray on the target for each range used is also provided as well as means for alternately impressing marking pulses and signal pulses upon the vertical deflecting plates. A slider carrying a cross-hair is provided in the illustrative embodiment hereinafter described, to facilitate comparison of positions of signal pulses with marking pulses.

Numerous other arrangements within the spirit and scope of the invention will occur to those skilled in the art. The principles of the invention will become more apparent during the course of the following description of illustrative embodiments of the features of the invention shown in the accompanying drawings in which:

Fig. 1 shows in schematic diagram form an object locating system employing a cathode ray indicator, which system is described to illustrate an application of the principles of the invention;

Fig. 2 indicates a typical arrangement of marking impulses which it is an object of the invention to provide;

Figure 5:
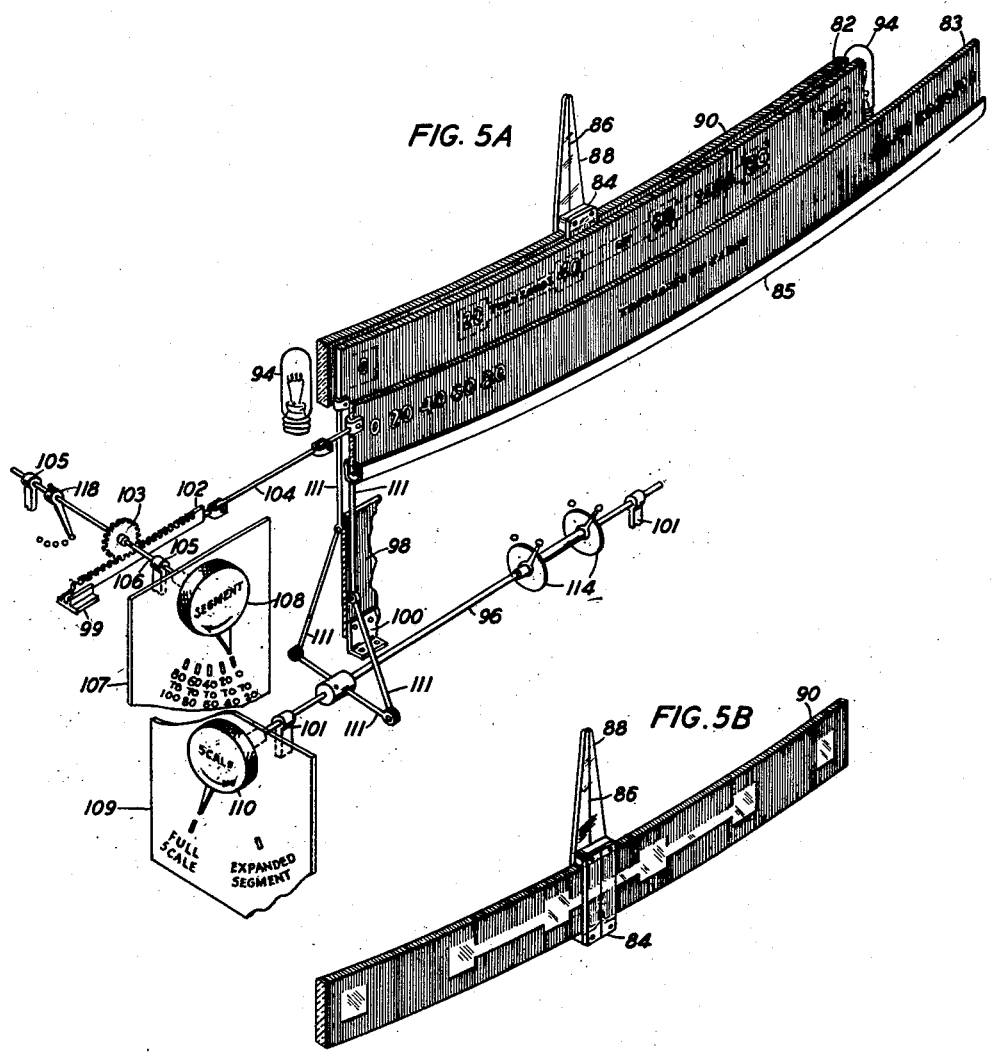
Figure 6:
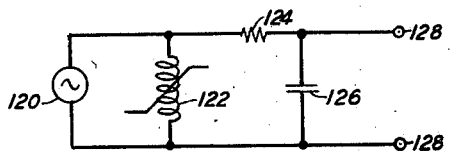
Figure 7A:
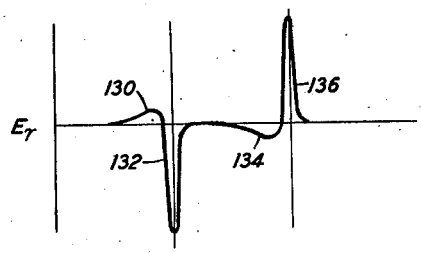
Figure 7B:
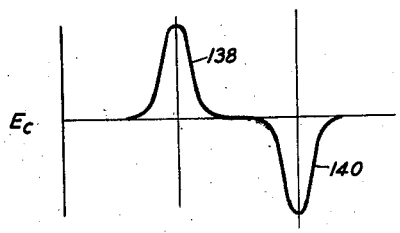
Figure 8A:
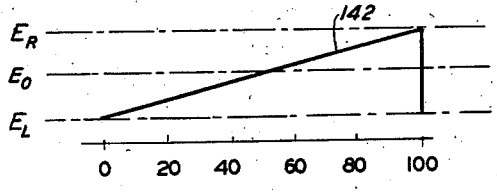
Figure 8B:
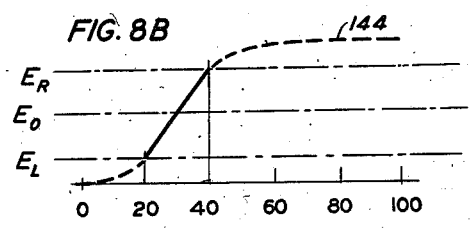
Figure 8C:
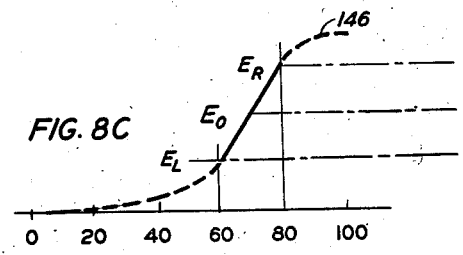

Fig. 5A indicates, in diagrammatic form, an arrangement for providing an appropriate scale for the full range of 100 thousand yards and a separate scale for expanded sections of 0 to 20, 20 to 40, etc., thousands of yards, respectively, as desired, the scales being coupled mechanically with control switches to appropriately adjust the electrical circuits to provide indications over the range for which an appropriate scale is provided, and an "edge illuminator" arranged to illuminate the appropriate designation symbols for the ranges selected;

Fig. 5B shows in detail the edge illuminator employed with the arrangements of Fig. 5A and a slider carrying a cross-hair arranged to slide along the edge illuminator;

Fig. 6 shows, in schematic diagram form, one suitable form of pulse generator for use in systems of the invention; Figs. 7A and 7B illustrate the wave forms of the voltages developed across the resistance and the capacity respectively, of the pulse generating circuit of Fig. 6;

Fig. 8A illustrates the variation of the sweep voltage with time when it is desired to make observations over the full scale of 100 thousand yards;

Figs. 8B and 8C illustrate the variations of the sweep voltage suitable for observations over expanded sections, only, of the full scale, namely, the sections 20 to 40 thousand yards and 60 to 80 thousand yards, respectively; and Fig. 9 shows in diagrammatic form the details of the circuit arrangements employed to select the full scale sweep voltage or any of the five expanded sectional scale sweep voltages.

Figure 1:
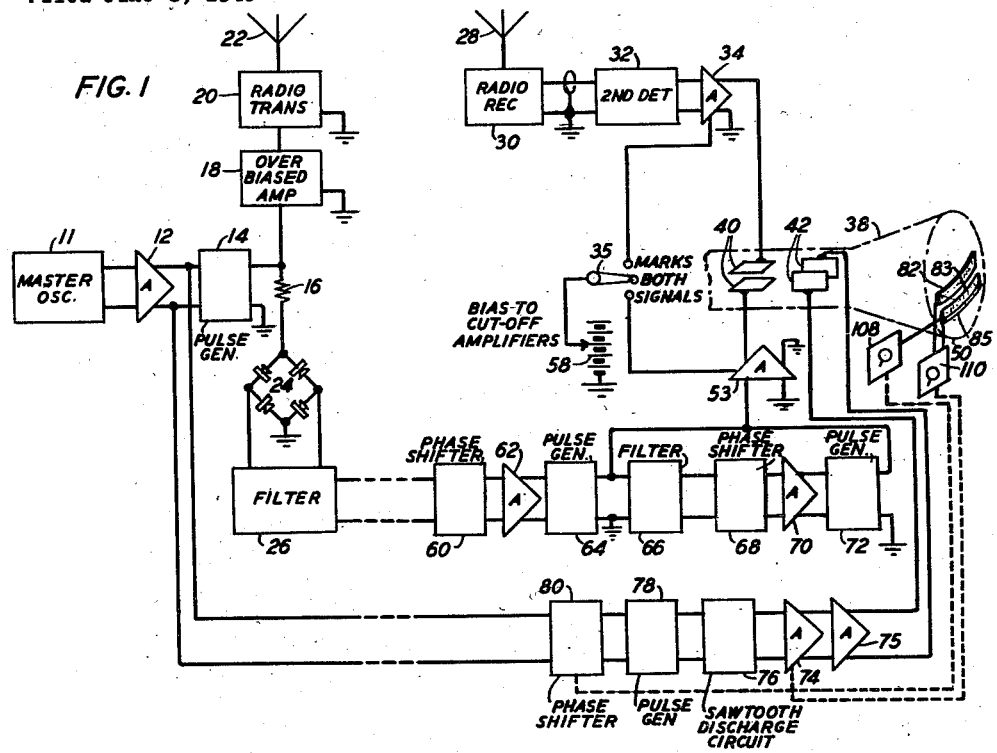

In more detail in Fig. 1, a distance measuring system is diagrammatically indicated. This system may, for example, be of the type in which a pulse of energy is directed toward a distant surface, its reflection from the distant surface to the point of transmission is received and the time interval elapsing between the instant of transmitting the pulse and the instant at which the reflection thereof is received is observed to obtain an indication of the distance to the reflecting surface. For purposes of illustration it will be assumed that distances up to 100 thousand yards are to be measured. Master oscillator 11 provides a convenient frequency such that a pulse caused to be emitted by the maximum positive voltage of the oscillator, in a manner to be described in detail hereinunder, travels to a reflecting surface 100 thousand yards distant and back to the transmitting point before the next succeeding pulse is caused to be emitted.

Amplifier 12 amplifies the output of oscillator 11 and furnishes energy to pulse generator 14 and also, through phase shifter 80, to pulse generator 78. The nature of these pulse generators will be described in detail hereinafter in connection with Figs. 6, 7A and 7B.

Pulse generator 14 furnishes a positive pulse of energy to over-biased amplifier 18 for each positive half cycle of oscillator 11, the output of amplifier 18 is introduced into radio transmitter 20 and the latter causes antenna 22 to emit a single sharp pulse of energy for each positive half cycle of oscillator 11.

Figure 2:
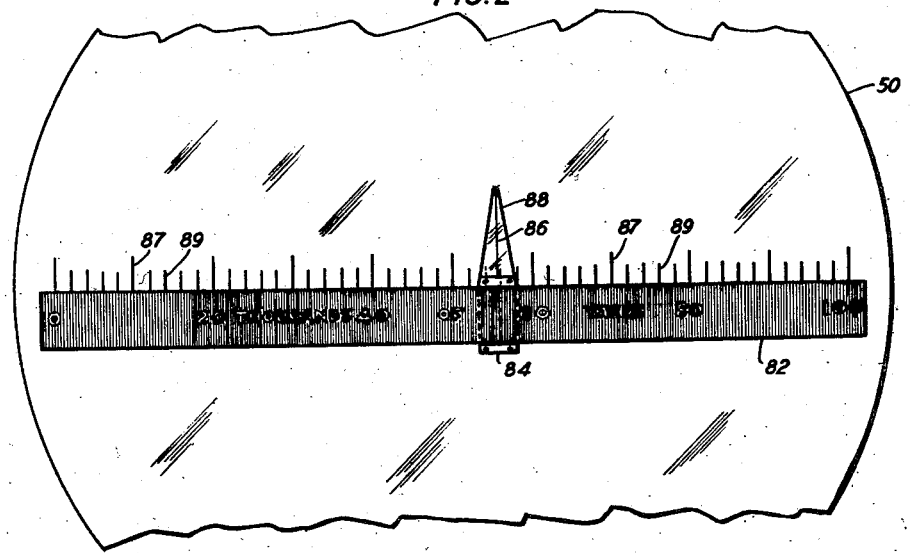

A small portion of the output of pulse generator 14 is taken off through impedance 16 to excite the marking pulse circuits. In the illustrative system being described, the harmonics required for marking pulses are the tenth and fiftieth, respectively, as illustrated in Fig. 2. The symmetrical positive and negative pulses at the output of pulse generator 14 contain only the odd harmonics of oscillator 11. Hence, the portion used to excite the marking pulse circuits is rectified by the bridge rectifier 24 to derive the even harmonics of oscillator 11 in a manner well known in the art. Bridge rectifier 24 comprises four rectifiers arranged in the familiar bridge circuit as shown. The individual rectifiers may be copper-oxide rectifiers or they may be of any of the several alternative types well known to the art. The harmonic desired for the first sequence of marking pulses (in the present example the tenth harmonic) is selected by filter 26, passed through phase shifter 60 and amplifier 62 to pulse generator 64 which produces ten sharp positive pulses for each positive pulse of generator 14. Phase shifter 60 is adjusted to cause one of these ten pulses to coincide in time with the positive pulse from generator 14. The harmonic desired for the second sequence of marking pulses (in the present example the fiftieth from generator 14 which is the fifth from generator 64) is selected by filter 66 from the output of generator 64 and passed through the phase shifter 68 and amplifier 70 to pulse generator 72 which produces five sharp positive pulses for each positive pulse of generator 64. Phase shifter 68 is adjusted to cause one of these five to coincide in time with the positive pulse from generator 64, thus properly aligning the marks as shown in Fig. 2, marks 87 being caused by pulses of generator 64 and marks 89 being caused by pulses of generator 72.

The marking pulses from generators 64 and 72 are passed through amplifier 53 which is biased to remove the negative portion of the pulses. The positive portions to be used for marks are applied to the vertical deflecting plates 40 of cathode ray tube 38, together with the receiver output as described below. In some instances the negative pulses may be employed to provide additional calibrating marks midway between those provided by the positive pulses. The negative pulses will, of course, deflect the ray in the opposite direction.

The pulses emitted by antenna 22 and the reflections thereof are received on antenna 28, amplified in a suitable radio receiver 30, detected in detector 32, amplified in amplifier 34 and impressed upon the vertical deflecting plates 40 of cathode ray tube 38.

Three-position switch 35 is provided so that a cut-off bias may be applied at will to either amplifier 34 or amplifier 53. Thus, the signals, the marking pulses, or both, may be applied to deflecting plates 40. These plates may also be provided with an adjustable bias voltage to suitably position the trace, by well-known circuits (not shown).

Connecting to the deflecting plates 42 of cathode ray tube 38 is an adjustable sweep circuit, including a phase shifter 80, the input of which is connected across the output of amplifier 12, a pulse generator 78, a saw-tooth discharge circuit 76 and amplifiers 74 and 75, the output of the latter of which connects to the above-mentioned deflecting plates 42. The details and operation of this circuit will be described in connection with Fig. 9.

Antennas 22 and 28 are preferably made highly directive by any of the numerous methods well known in the art, for example, by providing directive reflectors as for the antenna of the system described in United States Patent 2,151,549 issued March 21, 1939, to H. I. Becker. The antennas are, preferably, otherwise shielded from each other, for example, by interposing a simple conductive screen such as a sheet of copper between them to substantially reduce the direct reception by antenna 28 of energy emitted by antenna 22. Also, the effective gain of radio receiver 30 may be reduced to a low value by shunting the receiver input by a voltage limiting gas tube, or by any of the other similar numerous, well-known expedients in the art, during the instants energy is being emitted from antenna 22 alternatively, the directly received energy may be substantially balanced out, in a manner well known in the art, as illustrated, for example, in United States Patent 2,050,418, issued August 11, 1936, to T. J. Boerner, by energy introduced into receiver 30 through a circuit (not shown) providing energy precisely 180 degrees out of phase with respect to the directly received energy. A relatively small amount of energy, derived by direct transmission from antenna 22 to antenna 28, or otherwise, is desirable to provide a deflection on the cathode ray indicator at the instant of transmission, when the full range scale is being used.

As an illustrative set of parameters for the system of Fig. 1, assuming a maximum range of 100 thousand yards, master oscillator 11 may generate a frequency of 1,642 cycles per second, filter 26 may select the tenth harmonic or 16,420 cycles per second and filter 66 may select the fifth harmonic of the output of pulse generator 64, or 82,100 cycles per second. Thus the positive pulses from pulse generator 64 will represent spacings of 10 thousand yards and those from pulse generator 72 will represent spacings of 2 thousand yards. If the amplitude of the latter pulses is made smaller than the first-mentioned marking pulses, they will be readily distinguishable and the result will be substantially as illustrated in Fig. 2.

Adjustable sweep circuit including phase shifter 80, pulse generator 78, saw-tooth discharge circuit 76 and amplifiers 74 and 75 may be adjusted to sweep the scale of 100 thousand yards on the cathode ray target for each pulse of pulse generator 78 or they may be adjusted, as will be explained in detail hereinunder, so as to sweep the scale completely for successive portions, only, of the full range. (For example, any fifth portion of the interval, such as 0 to 20 thousand yards, 20 to 40 thousand yards, etc.) This latter feature permits an effective expanding of the scale in sections so that the positioning of received reflections of the emitted pulses with respect to any particular section of the scale may be examined in greater detail.

In Fig. 2 is shown an enlarged view of the target 50 of cathode ray tube 38 of Fig. 1 with both sets of marking pulses, i. e., those, designated 87, from pulse generator 64 and those, designated 89, from pulse generator 72 of Fig. 1, serving to create a scale along the horizontal path of the ray. Beneath the path of the ray is shown the 100-thousand yard reference scale 82 to be described in more detail in connection with Fig. 5A. Slider 84 carrying pointer 88 and cross-hair 86 is mounted on the edge illuminator 90 which is located behind scale 82. The details of the illuminator and slider are shown in Fig. 5B.

Figure 3:
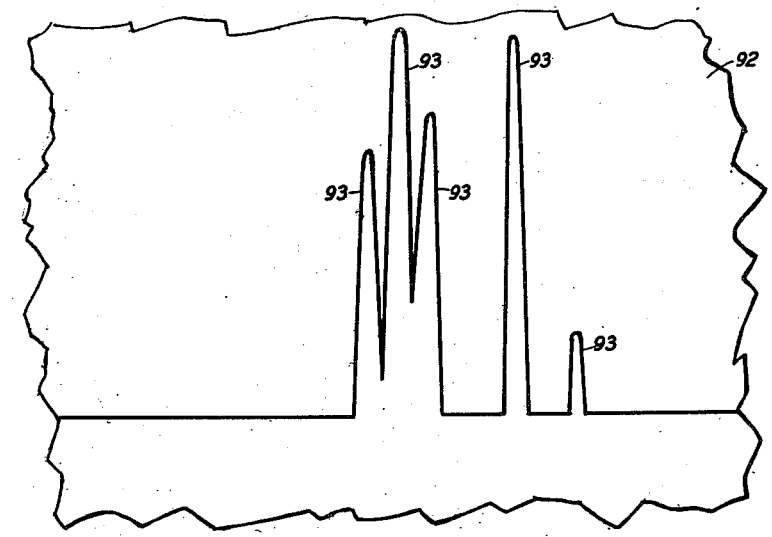
Fig. 3 illustrates, to an enlarged scale, a cluster of signals, the positions of the component signals of which it is desired to determine.

In Fig. 3 is shown an enlarged section 92 of the target 50 of cathode ray tube 38 of Fig. 1 on which section the ray is shown as tracing a cluster of reflected signals 93, representing reflections of differing amplitudes from a number of surfaces at different distances from the transmitter.

Figure 4:
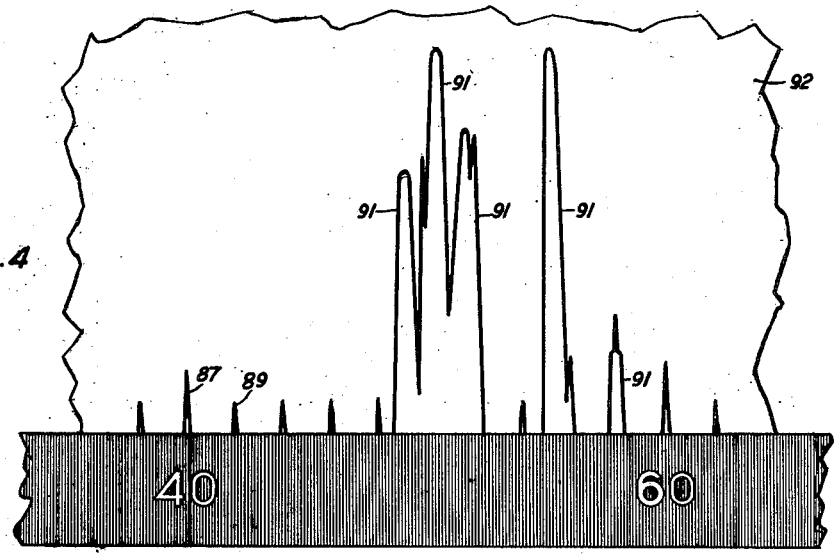
Fig. 4 illustrates, to an enlarged scale, the displacement of the calibrating markings caused by superimposing the cluster of signals of Fig. 3 upon the marking pulses.

In Fig. 4 the calibrating pulses of pulse generators 64 and 72 of Fig. 1 have been superimposed on the signal pulses of Fig. 3. Fig. 4 illustrates the desirability of the arrangement provided in the system of Fig. 1, including switch 35 and battery 58, whereby either the signals or the marking pulses, or both, may be impressed upon the vertical deflecting plates by suitably operating switch 35. A further convenience is the slider 84, shown in Fig. 2, carrying a cross-hair which may be moved along edge illuminator bar 90 until the hair is centered on a signal pulse of particular interest. The signal may then be switched off and the marking pulses switched on to the vertical deflecting plates, and the position of the hair relative to the marking pulses may be noted.

In Fig. 5A are shown, in mechanical diagrammatic form, the details of the mechanism employed to select the desired scale (of the six available).

The scale carried on member 82 covers the entire range, as indicated, from 0 to 100 thousand yards. Member 83, arranged to slide in trough 85, carries designations for the five expanded sections of 0 to 20, 20 to 40, etc., thousand yards, respectively.

Control knob 110 actuates rods 111 and slides either member 82 or member 83 up into position while at the same time drawing the other member down, as indicated in the figure.

Control knob 108 actuates pinion 103 which causes rack 102 to move laterally. Rack 102 through rod 104 causes member 83 to slide in member 85 and asusme the appropriate position for the particular expanded segment of the scale selected.

Electrical switches 114 and 118, also operated by turning control knobs 110 and 108, respectively, control circuits which will be explained in detail in connection with Fig. 9.

Member 90, as appears more fully in Fig. 5B, is a transparent, edge-illuminated, plastic strip having diffusing windows, through an otherwise masked front surface, suitably positioned to illuminate the appropriate scale designations for each of the six scales which may be placed before it.

Strip 90 also serves to carry slider 84 whose pointer 88 carries a cross-hair 86, which may be centered upon a signal of particular interest, as discussed above, to facilitate determining the position of the signals with respect to the marking pulses.

Lamps 94, of Fig. 5A, serve to provide illumination to the end surfaces (edges) of strip 90.

Bearings 101 and 105, guides 98 and 99, support 100 and engraved plates 107 and 109 are carried on a fixed base. Rod 104 is provided with hinge pivots at both ends and is of such length that it may be moved vertically as required in normal use without causing any appreciable lateral motion of member 83.

In Fig. 6 is shown a schematic diagram of one form of circuit suitable for generating pulses. (The principles underlying the devices designated in this application as "pulse generators," i. e. units 14, 64, 72 and 78 of Fig. 1, will be apparent in connection with the description of Fig. 6.)

This circuit requires an oscillator 120 or other suitable source of alternating current, which furnishes a frequency having the same number of cycles per second as the number of pulses of like polarity desired per second at the output terminals 128 of the circuit. This frequency is supplied to a non-linear coil 122 of the kind, for example, described in United States Patent 2,130,508 issued September 20, 1938, to E. Peterson. Shunted across the coil terminals is the series combination of a resistance 124 and a condenser 126, the voltage developed across the condenser 126 being led to terminals 128.

The operation of the circuit of Fig. 6 is as follows:

As the alternating current through coil 122 approaches zero value, the impedance of coil 122 rises to a high value and condenser 126 is accordingly charged through resistance 124. When the current in coil 122 reaches a predetermined (small) value after passing through zero, the core of the coil becomes saturated, the impedance of coil 122 drops substantially to zero and condenser 126 discharges through resistance 124 and coil 122.

The voltages developed, during a cycle as above described, across resistance 124 and condenser 126 are shown in Figs. 7A and 7B, respectively. The time duration of the pulses is greatly exaggerated in these sketches in order to indicate the wave shapes.

It is known in the art to employ the voltage pulses developed across resistance 124 in harmonic generating systems. However, it should be noted that this voltage "$E_r$," Fig. 7A, has a small positive pulse 130 preceding its large negative pulse 132 and a small negative pulse 134 preceding its large positive pulse 136.

Upon examining the voltage developed across the condenser "$E_c$," Fig. 7B, no small pulses of opposite sign preceding the large pulses 138 and 140 are found to occur. Furthermore, the breadth or time duration of the large pulses 138 and 140, Fig. 7B, is substantially greater than the breadth of the large pulses 132 and 136, Fig. 7A, of the voltage across the resistance "$E_r$." The voltage across the condenser is preferable for exciting the transmitter in systems of the present invention because the small pulses of the resistive voltage "$E_r$" might cause false operation and further since the broader pulses are of more suitable duration. On the other hand, the sharpest pulse which may be obtained by practicable means is usually desirable for use in sweep circuits, including that of the illustrative system of Fig. 1, so that for pulse generator 78 the voltage across the resistance is employed.

The biases on the cathode ray indicator are adjusted so that, in the absence of sweep circuit voltage and signal pulses, the beam will impinge upon the center point of the target. Assuming that a biasing voltage $E_L$ is just sufficient to deflect the beam from its central position to the extreme left edge of the screen and that a biasing voltage of $E_R$ is likewise just sufficient to deflect it to the extreme right edge of the screen, it is obvious that for a linear horizontal sweep, the sweep circuit should provide a voltage varying linearly between the values $E_L$ and $E_R$ for any particular time interval of interest.

Thus for the full range of 100 thousand yards, assumed for the illustrative system of Fig. 1, a sweep circuit voltage of regular saw-tooth shape varying between $E_L$ and $E_R$ during the time interval required by a pulse to travel to a reflecting surface 100 thousand yards distant and back to its point of origin, would be suitable. Such a voltage is illustrated by curve 142 of Fig. 8A wherein the abscissae 0, 20, 40, 60, 80 and 100 represent time of travel intervals for a pulse directed to and reflected back to its point of origin from reflecting surfaces, the respective number of thousands of yards distant. The ordinates represent the deflecting voltage which varies linearly between the values $E_L$ and $E_R$ defined above.

To examine in more detail particular intervals of the full range, for example, the interval between 20 and 40 thousand yards, a voltage varying linearly between $E_L$ and $E_R$ during the time interval in which echoes from surfaces 20 to 40 thousand yards distant, inclusive, would return to the point of emission, is necessary. One convenient method of obtaining such a voltage by distorting the regular saw-tooth voltage of Fig. 8A will be described in detail in connection with Fig. 9. The resulting curve 144 of Fig. 8B provides a sweep voltage which is suitable for the desired purpose. The portions of curve 144 below $E_L$ and above $E_R$ since they exceed the respective limiting voltages, as defined above, deflect the beam off the target so that pulses received in any but the particular time interval of interest will produce no visible deflection on the screen. As a further illustration, curve 146 of Fig. 8C shows a sweep voltage variation curve suitable for more detailed examination of the range 60 to 80 thousand yards. The method and apparatus for obtaining the above and similar variations suitable for detailed examination of the ranges 0 to 20, 40 to 60 and 80 to 100, respectively, will now be described in detail.

In Fig. 9 the circuit arangements whereby suitable sweep circuit voltages may be obtained for the several scales, as described above, are shown in schematic diagram form.

Fig. 9 indicates in detail the electrical functions which are performed by switches 118 and 114, when control knobs 108 and 110, respectively, of Fig. 5A are operated.

Though a variable phase shifter of any of the numerous well-known types could be used, in practice the most convenient arrangement is to obtain the six different phase shifts required for the respective scales by switching into the circuit separate and independent phase shifters, each unit being preadjusted to give the required shift for its particular scale. Such an arangement is, therefore, shown in Fig. 9. Thus the phase shifter 80 of Fig. 1 which supplies the pulse generator 78 and sweep circuit 76 is shown in Fig. 9 as comprising six separate phase shifters, which are designated 80A to 80F, inclusive. When control knob 110 (Fig. 5A) is in the full scale position, switch 114 (Fig. 9), comprising two blades each having two positions, connects the input to the circuit through phase shifter 80A and places the gain of the sweep amplifier 74 under control of potentiometer 152. Pulse generator 78 produces a sharp positive pulse for each cycle of master oscillator 11 (Fig. 1), which is changed by methods well known in the art to a saw-tooth wave by discharge circuit 76, and amplified by amplifiers 74 and 75 to produce the horizontal linear sweep required for the full scale of 100 thousand yards. Gain control 152 is set so that the output of amplifier 75, as described above and as shown in curve 142, Fig. 8A, is just sufficient to deflect the ray completely across the screen. Phase shifter 80A is set to make the sweep start in phase with the emitted pulse from the transmitter.

When the control knob 110 (Fig. 5A) is in the "expanded segment" position, the phase of the sweep circuit (Fig. 9) is determined by one of the phase shifters 80B to 80F, as selected by switch 113. Also, the gain of amplifiers 74 and 75 is placed under the control of potentiometer 150. This potentiometer is set to make the gain of the sweep amplifiers greater than obtained in the full scale position by approximately the ratio by which it is desired to expand a segment of the scale. Under this high gain adjustment amplifiers 74 and 75 overload and produce an output no longer of saw-tooth shape as shown, for example, in curves 144 and 146 of Figs. 8B and 8C. The distortion is of no consequence since, as mentioned above, the distorted portions of the waves (shown dotted in 8B and 8C) deflect the ray off the target of the cathode ray tube and are not observed. Phase shifters 80B to 80F, respectively, are adjusted to cause the linear portions of the waves to occur at appropriate times with respect to the emitted pulse in order to display the selected segment on the target, as desired.

The above-described arrangements are merely illustrative of specific applications of the principles of the invention and by no means exhaustively exemplify the numerous applications thereof which will readily occur to those skilled in the art. The scope of the invention is defined in the appended claims.

What is claimed is:

1. In a cathode ray indicator having a pair of vertical deflecting plates, means for sweeping the ray horizontally across the target of said indicator at a predetermined rate during successive time intervals of a predetermined length, means for impressing on said vertical deflecting plates a first plurality of signals the time relations between which are to be determined, means for simultaneously impressing upon said vertical deflecting plates a second plurality of signals having known time spacings therebetween, and means for adjusting the duration of and the spacing between the successive time intervals during which the ray is swept horizontally across the target of said indicator to coincide with any one of a plurality of integral portions of the first-mentioned horizontal sweep whereby a plurality of integral portions of the normal full scale of said indicator may be examined severally in detail and the scale provided by the said second plurality of signals of known time spacing is expanded to afford greater precision in determining the spacing of the signals of said first plurality of signals appearing in the integral portion of the full scale so selected.

2. In combination, means to transmit a first series of periodic pulses and to receive echoes thereof over a predetermined interval after each transmitted pulse, means to produce a second series of periodic pulses of the same frequency as said first series, a cathode-ray oscillograph connected and arranged to indicate received echoes, means to operate said oscillograph to indicate said echoes only during a portion of each of said second series of pulses, said portion being short with respect to said predetermined interval and means to vary the phase relation between said first and said second series of periodic pulses thereby to vary the time in said interval when said oscillograph is operated by said last means.

3. In combination, means to transmit a first series of periodic pulses and to receive echoes thereof over a predetermined interval after each transmitted pulse, means to produce a second series of periodic pulses of the same frequency as said first series, a cathode-ray oscillograph connected and arranged to indicate received echoes, means controlled by said second series of pulses to operate said oscillograph to indicate said echoes during a portion only of said interval, said portion being short with respect to said predetermined interval, and means to vary the phase relation between said first and said second series of periodic pulses thereby to vary the time in said interval when said oscillograph is operated by said last means.

References Cited in the file of this patent

UNITED STATES PATENTS

| Number | Name | Date |
|---|---|---|
| 1,756,131 | Ohl | Apr. 29, 1930 |
| 1,908,249 | Hund | May 9, 1933 |
| 1,969,573 | Montgomery et al. | Aug. 7, 1934 |
| 2,000,362 | Terman | May 7, 1935 |
| 2,063,610 | Linsell | Dec. 8, 1936 |
| 2,077,172 | Hearn | Apr. 13, 1937 |
| 2,084,760 | Beverage | June 22, 1937 |
| 2,088,495 | Swedlund | July 27, 1937 |
| 2,103,090 | Plebanski | Dec. 21, 1937 |
| 2,121,359 | Luck et al. | June 21, 1938 |
| 2,132,225 | Subrizi | Oct. 4, 1938 |
| 2,171,216 | Koch | Aug. 29, 1939 |
| 2,178,074 | Jakel et al. | Oct. 31, 1939 |
| 2,208,648 | Schrader | July 23, 1940 |
| 2,215,197 | Sherman | Sept. 17, 1940 |
| 2,225,046 | Hunter | Dec. 17, 1940 |
| 2,227,598 | Luman et al. | Jan. 7, 1941 |
| 2,244,513 | Burton | June 3, 1941 |
| 2,280,226 | Firestone | Apr. 21, 1942 |
| 2,300,189 | Wolff | Oct. 27, 1942 |

FOREIGN PATENTS

| Number | Country | Date |
|---|---|---|
| 111,594 | Australia | Mar. 19, 1939 |
| 496,666 | Great Britain | Dec. 5, 1938 |